United States Patent Office 3,342,831
Patented Sept. 19, 1967

3,342,831
PROCESS FOR THE PRODUCTION OF A PRIMARY AMINOANTHRAQUINONE BY CONVERSION OF AN N-CYCLOHEXYLAMINOANTHRAQUINONE
Willy Braun, Heidelberg, and Manfred Ruske, Ludwigshafen (Rhine), Germany, assignors to Badische Anilin- & Soda - Fabrik Aktiengesellschaft, Ludwigshafen (Rhine), Germany
No Drawing. Filed Aug. 7, 1964, Ser. No. 388,265
Claims priority, application Germany, Aug. 13, 1963, B 73,096
5 Claims. (Cl. 260—307.5)

This invention relates to a new process for the manufacture of aminoanthraquinones some of which have not hitherto been available or have had to be prepared by very complicated methods.

It has long been known that in the thermal treatment of hydrohalides of secondary amines primary amines may be obtained. This method has not achieved practical importance on account of the irregular course of the reaction. Moreover it is known that N-substituted sulfonamides, particularly N-substituted p-toluenesulfonamides, can be split into amines by hydrolysis with strong acids, for example sulfuric acid or hydrochloric acid. This method is not useful unless the sulfonamides are readily available.

It is an object of the invention to provide a new process for the production of aminoanthraquinones. It is another object of the invention to provide a process for the production of aminoanthraquinones which uses readily obtainable initial materials. It is a further object of the invention to provide a process for the production of aminoanthraquinones that have not hitherto been accessible or that have been difficult to produce. These and other objects of the invention are achieved by allowing a melt of aluminum chloride and a melting point depressant to act on a secondary amine which contains (a) a cyclohexyl radical and (b) an unsubstituted or substituted anthraquinone radical.

This method has several advantages over that using arylsulfonamides. Firstly cyclohexylamino compounds are not, like arylsulfonamido compounds, accessible only from halogen compounds but also from other compounds having negative substituents, as for example sulfonic acids or nitro compounds, by their reaction with cyclohexylamine, so that according to the new amine synthesis, a far greater number of initial materials may be converted into the corresponding amines.

A further considerable advantage is that in compounds having a plurality of negative substituents of equal reactivity, as for example 1,4- and 1,5-dichloroanthraquinone, only one of the groups may if desired be reacted with cyclohexylamine so that after cleavage aminohalogen compounds or aminosulfonic acids are obtained. This definite exchange of only one of the chlorine atoms of dichloroanthraquinones is not possible with toluene-sulfonamide because usually, besides unchanged initial material, a mixture of monotosylamino and ditosylamino compounds is formed, the aminohalogen compounds being obtained usually in yields of less than 50%.

Suitable initial materials are secondary cyclohexyl amines which contain a substituted or unsubstituted anthraquinone radical on the nitrogen atom. The substituents may be inert, for example halogen atoms, especially chlorine and/or bromine atoms, carboxyl groups, sulfonic acid groups, amino groups, or alkylamino, alkyl, alkoxy, acetyl, benzoyl, thiophenyl or benzoxazolyl radicals. It is also possible to use substituents which undergo change under the reaction conditions. For example, a nitrile group or a carboxylic amide group may be saponified. If reactive chlorine atoms are contained in the anthraquinone radical, those may also be hydrolyzed to hydroxyl groups.

Suitable initial materials are accordingly: 1-cyclohexylaminoanthraquinone-5-sulfonic acid, 1-cyclohexylaminoanthraquinone - 6-sulfonic acid, 1 - cyclohexylamino - 4-chloroanthraquinone, 1-cyclohexylamino-4-bromoanthraquinone, 1-cyclohexylamino - 2 - cyanoanthraquinone, 1-cyclohexylaminoanthraquinone - 2 - carboxylic amide, 1-amino-2-cyano-4-cyclohexylaminoanthraquinone,1-amino-2-carboxylic-amido-4-cyclohexylaminoanthraquinone, 1,5-dicyclohexylaminoanthraquinone, 1 - cyclohexylamino-2-methoxyanthraquinone, 1-amino-2-methoxy-4-cyclohexylaminoanthraquinone, 1 - cyclohexylamino-4-chloroanthraquinone-6-sulfonic acid, 1 - cyclohexylamino-4-chloroanthraquinone-6-carboxylic acid, 1-amino-2-acetyl-4-cyclohexylaminoanthraquinone, 1,4 - cyclohexylaminochloro-6-benzoxazoloanthraquinone, 1,4-cyclohexylaminochloro-6-benzoylanthraquinone, 1 - cyclohexylamino-4-thiophenylanthraquinone, 1,5 - dicyclohexylamino-4,8-dithiophenylanthraquinone, 1,5-dicyclohexylamino-4,8-dibromoanthraquinone, 1-cyclohexylamino-5-chloroanthraquinone and so on.

The cyclohexylaminoanthraquinones used as initial materials are as a rule easily accessible from appropriately substituted anthraquinone halogen, nitro or sulfonic acid compounds by reaction with cyclohexylamine, for example by heating by conventional methods; when two halogen atoms or sulfonic acid groups are present in the molecule, monocyclohexylamino-substituted or dicyclohexylamino-substituted anthraquinones may be obtained depending on the relative proportions used.

For example the production of cyclohexylamino compounds from haloanthraquinones is advantageously carried out in organic solvents, for example chlorobenzene, dichlorobenzene or nitrobenzene, or in cyclohexylamine itself, if necessary in the presence of acid-binding agents, for example alkali metal carbonates, and catalysts, for example copper or its oxides or salts. Except when cyclohexylamine serves as the solvent, one to three gram-moles of cyclohexylamine is used for each gram-atom of halogen, or in the case of partial exchange of one of two halogen atoms present, only 1.0 to 1.5 gram-moles of cyclohexylamine for each gram-mole of haloanthraquinone. The reaction temperatures depend on the excess of cyclohexylamine and are in general from 120° to 180° C. If the initial materials are soluble in water, they are advantageously reacted in cyclohexylamine or in aqueous cyclohexylamine at the boiling temperature or in a pressure vessel at up to 200° C. When exchanging a sulfonic acid group in an anthraquinone for a cyclohexylamino radical, the components may be reacted in aqueous solution in about equivalent amounts, and when exchanging all the sulfonic acid groups, also with an excess of cyclohexylamine, at elevated temperature, preferably at 120° to 190° C., if necessary under pressure. Adding an oxidizing agent, for example m-nitrobenzenesulfonic acid, is often advantageous. Exchange of the nitro groups in aromatic compounds for a cyclohexylamino group may in general be carried out in cyclohexylamine or aqueous cyclohexylamine; the reaction temperature is in general from 50° C. to the boiling point of the reaction mixture.

In the preferred cyclohexylaminoanthraquinones, 1 or 2 cyclohexylamino groups are in α position and up to 4 other substituents may be present in the molecule. If alkyl groups are present either as substituents or in alkylamino groups and/or if alkoxy groups are contained in the aminoanthraquinones as substituents, the alkyl and alkoxy groups contain from 1 to 4 carbon atoms.

Aluminum chloride melts containing melting point depressants, such as are described in German patent specification No. 878,647, are preferred. These are mixtures of anhydrous aluminum chloride and compounds having the general constitution $X^1$—CO—$X^2$ in which $X^1$ denotes hydrogen, a halogen or an alkyl or amino group and $X^2$ may denote an unsubstituted or mono- or diallyl-substituted amino group or, if $X^1$ is hydrogen, an -O-metal group. If $X^1$ and/or $X^2$ stand for alkyl groups or the amino groups are substituted with 1 or 2 alkyl groups, the alkyl groups contain 1 to 4 carbon atoms. $X^1$ and $X^2$ when taken together may stand for an alkylene radical with 3 to 6 methylene groups which together with the CO groups may form an inner amide, the amide nitrogen if desired being substituted with an alkyl group. Examples of such melting point depressants are sodium and potassium formates, formamide, methylformamide, dimethylformamide, N-methyl-pyrrolidone, acetamide, propionamide, urea, dimethylurea, carbamyl chloride, methylcarbamic acid and dimethylcarbamic acid. The solidification points of the mixtures may vary within wide limits according to the type and amount of melting point depressant used. In general, an addition of 10 to 30%, based on aluminum chloride, of the said compounds is sufficient to produce melts that are liquid at ordinary temperature. Other mixtures of anhydrous aluminum chloride with other melting point depressants, for example sodium chloride, potassium chloride or potassium fluoride, are also suitable. In this case, it is advantageous to add an amount of 5 to 30% by weight. Aluminum chloride melts are used particularly when sulfonation is to be avoided.

To split the cyclohexylaminoanthraquinone compounds, they are mixed with the aluminum chloride melt and if necessary heated, the cyclohexylaminoanthraquinone to be split and the liquid acid reagent being usually employed in a ratio from 1:1 to 1:30, particularly from 1:5 to 1:15. Lower concentrations of the amine to be split in the liquid acid reagent may in most cases be used without disadvantage. The reaction temperature and the reaction period depend partly on the initial material and partly on the acid reagent used for splitting. In general, the reaction temperature is between about 15° and 100° C. with a reaction period of from about fifteen minutes to five hours. It is advantageous to determine the most favorable conditions by simple preliminary experiment. Usually the process is carried out at atmospheric pressure, but naturally superatmospheric or subatmospheric pressures may also be used.

Isolation of the primary aminoanthraquinones from the reaction mixture is carried out by conventional methods. For separation of the desired products from aluminum chloride melts, the procedure may be for example as follows: the melt is poured into water to which a little hydrochloric acid and if desired some ice has been added. The amino compounds separated in solid form are suction filtered and contaminants are washed out with water or, in the case of water-soluble amino compounds, with dilute hydrochloric acid or an appropriate salt solution.

The aminoanthraquinones prepared according to this invention are either themselves dyes or intermediates for the production of dyes.

The invention is further illustrated by the following examples. The parts specified in the examples are parts by weight and the percentages are percentages by weight.

*Example 1*

50 parts of anhydrous aluminum chloride and 10 parts of urea are melted according to Example 1 of German patent specification No. 878,647. 5 parts of 1,4-cyclohexylaminochloro - 6 - benzoxazolanthraquinone is introduced into this melt at 40° to 50° C. and the mixture is stirred for about 3 hours at 50° to 55° C. To isolate the amine, the melt is poured into about 500 ml. of dilute hydrochloric acid, the deposited amino compound is suction filtered in solid form, washed with water until neutral and dried. 3.5 parts of 1-amino-4-chloro-6-benzoxazoloanthraquinone is obtained as an orange powder having a melting point of 263° to 265° C.

The 1-cyclohexylamino-4-chloro-6-benzoxazoloanthraquinone is prepared as follows:

A mixture of 131 parts of 1,4-dichloro-6-benzoxazoloanthraquinone, 46.7 parts of cyclohexylamine, 2 parts of copper oxide, 18 parts of potassium carbonate and 650 parts of o-dichlorobenzene is heated to 170° C. within about two hours while stirring and kept at this temperature for three to five hours. The solution is cooled and stirred into water, neutralized and the o-dichlorobenzene expelled with steam. The product is suction filtered and dried and about 146 parts (92.6% of the theory) of a red violet powder having a nitrogen content of 5.9% and a chlorine content of 8.2% (the calculated values for $C_{27}H_{21}ClO_3N_2$ (456.6) being N 6.1 and Cl. 7.78) is obtained.

*Example 2*

100 parts of aluminum chloride and 20 parts of urea are fused according to the process of German patent specification No. 878,647, 10 parts of 1-cyclohexylaminoanthraquinone-5-sulfonic acid is introduced and the whole stirred for two to three hours at 50° C. The melt is broken up with dilute hydrochloric acid, filtered by suction, washed with 4% hydrochloric acid and dried. 7.8 parts of 1-aminoanthraquinone-5-sulfonic acid is obtained. Calculated: N 4.62. Found: N 4.28.

*Example 3*

7.7 parts of 1-cyclohexylaminoanthraquinone-6-sulfonic acid is stirred at 30° C. into an aluminum chloride melt of 100 parts of aluminum chloride and 15 parts of dimethyl formamide and the mixture is heated for two hours at 40° to 45° C. The liquid reaction mixture is poured into about 500 parts of dilute hydrochloric acid and the crystallizate is suction filtered, washed with dilute hydrochloric acid and dried:

6.1 parts of 1-aminoanthraquinone-6-sulfonic acid is obtained. Calculated: N/S 0.440. Found: N/S 0.456.

The 1-cyclohexylaminoanthraquinone-6-sulfonic acid is obtained from 1-nitroanthraquinone-6-sulfonic acid in aqueous cyclohexylamine at 80° C.

*Example 4*

5 parts of 1-cyclohexylamino-4-chloroanthraquinone is stirred in portions into a melt, cooled to 40° C., of 50 parts of aluminum chloride and 10 parts of urea (prepared according to the process of German patent specification No. 878,647). The mixture is stirred for about an hour at 40° to 45° C. The melt is then added to about 300 parts of ice water containing hydrochloric acid (pH value 1 to 2). About 3.8 parts of 1-amino-4-chloroanthraquinone is obtained after drying.

1-cyclohexylamino-4-chloroanthraquinone is obtained from 1,4-dichloroanthraquinone and cyclohexylamine by stirring 225.5 parts of o-dichlorobenzene, 55.5 parts of 1,4-dichloroanthraquinone, 30 parts of cyclohexylamine, 9.75 parts of potassium carbonate and 1 part of copper oxide for five to six hours at 150° to 155° C., removing the solvent with steam, suction filtering the residue, washing it with water and drying it. About 67.5 parts of 1-cyclohexylamino - 4 - chloroanthraquinone is obtained. For $C_{20}H_{18}ClNO_2$ (339.5): Calculated: N 4.34, Cl 10.99. Found: N 4.05, Cl 10.2.

*Example 5*

50 parts of 1-amino-2-cyano-4-cyclohexylaminoanthraquinone is stirred in portions into a melt, prepared at 110° C. and cooled to 25° C., of 400 parts of aluminum chloride and 80 parts of urea. The mixture is heated for about two hours at 30° to 35° C., the solid is precipitated in ice water, suction filtered, washed with water and dried at 110° C. The yield is about 40 parts of 1,4-diamino-2-cyanoanthraquinone having a melting point of from 243° to 246° C. The compound dyes polyester fibers clear reddish blue shades.

*Example 6*

10 parts of 1-cyclohexylaminoanthraquinone-2-carboxylic acid cyclohexylamide is introduced into an aluminum chloride-urea melt (prepared as in Example 2) at 40° C. and stirred at 45° to 50° C. for about two hours. The reaction mixture is processed in the same way as in Example 2. About 8 parts of 1-aminoanthraquinone-2-carboxylic acid cyclohexylamide is obtained having a melting point of 279° to 280° C. The same result is achieved by carrying out the cleavage at 70° to 80° C. in an aluminum chloride-sodium formate melt (prepared according to Example 2 of German patent specification No. 878,647).

1-cyclohexylaminoanthraquinone-2-carboxylic acid cyclohexylamide may easily be obtained from 1-nitroanthraquinone-2-carboxylic acid chloride and cyclohexylamine by heating in the molar ratio 1:15.

*Example 7*

19.2 parts of 1,4-cyclohexylaminochloroanthraquinone-6-carboxylic acid is introduced into a melt, prepared at 120° C. and cooled to 30° C., of 200 parts of aluminum chloride and 30 parts of urea and the whole is stirred for 90 minutes at 40° C. The melt is poured into approximately 1,000 parts of ice-cold dilute hydrochloric acid and the precipitated solids are separated and washed neutral with water. 15 parts of 1,4-aminochloroanthraquinone-6-carboxylic acid is obtained in the form of a ruby-red powder. An aqueous-alkaline solution of the compound is orange-red.

*Example 8*

8 parts of 1-amino-4-cyclohexylaminoanthraquinone-2-carboxylic amide is introduced at 80° to 85° C. in the course of 15 to 20 minutes into a homogeneous melt of 100 parts of anhydrous aluminum chloride and 15 parts of sodium chloride. The melt is kept at a temperature of 85° to 90° C. for 30 minutes and then broken up with dilute hydrochloric acid. The precipitated solids are filtered off with suction, washed with water and dried.

6.9 parts of 1,4-diaminoanthraquinone-2-carboxylic amide is isolated in the form of a dark blue powder. The compound dyes acetate silk, polyamide fibers and polyester fibers reddish blue shades. Its melting point is 258° to 259° C.

*Example 9*

10 parts of 1,4-cyclohexylaminochloroanthraquinone-6-carboxylic acid is introduced at 80° C. in the course of 15 to 20 minutes into a melt of 100 parts of anhydrous aluminum chloride, 12.5 parts of sodium chloride and 5 parts of potassium chloride. After 15 to 30 minutes the melt is worked up as described in Example 8.

7.8 parts of a product is obtained which is identical with that described in Example 7.

*Example 10*

17 parts of 1-cyclohexylamino-5-chloroanthraquinone is introduced into a melt, prepared at 110° C. and cooled to 35° C., of 200 parts of anhydrous aluminum chloride and 30 parts of urea. The mixture is kept at a temperature of 40° to 45° C. for 30 to 50 minutes and the solids are precipitated by pouring the melt into 1,000 parts of ice-cold dilute aqueous hydrochloric acid, filtered off with suction and dried. 12.8 parts of 1-amino-5-chloroanthraquinone is obtained in the form of an orange-red powder. A solution of the compound in concentrated sulfuric acid is yellow brown, and violet upon addition of paraformaldehyde.

We claim:

1. A process for the production of primary amines of the anthraquinone series which comprises allowing a melt of aluminum chloride containing a melting point depressant for said aluminum chloride to act on an N-cyclohexylaminoanthraquinone.

2. A process as claimed in claim 1 wherein said melting point depressant is a compound of one of the formulae selected from the group consisting of $X^1$—CO—$X^2$, HCO—O—Me and

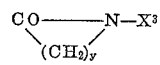

wherein $X^1$ denotes a member selected from the group consisting of hydrogen, halogen, alkyl of 1 to 4 carbon atoms and amino, $X^2$ denotes amino, monoalkylamino and dialkylamino with each alkyl group substituted on the amino containing 1 to 4 carbon atoms, Me denotes a metal selected from the group consisting of sodium and potassium, $y$ denotes an integer of from 3 to 6, and $X^3$ denotes a member selected from the group consisting of hydrogen and alkyl of 1 to 4 carbon atoms.

3. A process as claimed in claim 1 wherein the molar ratio of said melt of aluminum chloride to the secondary amine lies between 1:1 and 1:30.

4. A process as claimed in claim 1 wherein the molar ratio of said melt of aluminum chloride to the secondary amine lies between 1:5 and 1:15.

5. A process for the production of primary amines of the anthraquinone series by allowing a melt of aluminum chloride containing a melting point depressant for said aluminum chloride to act on an N-cyclohexylaminoanthraquinone at a temperature of from 15° to 100° C.

References Cited

Baker et al.: J. Am. Chem. Soc., vol. 69 (1947), page 704.

Hickinbottom: J. Chem. Soc., London, 1913, pages 1070–1073.

ALEX MAZEL, *Primary Examiner.*

HENRY R. JILES, *Examiner.*

RICHARD J. GALLAGHER, *Assistant Examiner.*

UNITED STATES PATENT OFFICE
CERTIFICATE OF CORRECTION

Patent No. 3,342,831 September 19, 1967

Willy Braun et al.

It is hereby certified that error appears in the above numbered patent requiring correction and that the said Letters Patent should read as corrected below.

Column 6, line 49, for "1913" read -- 1933 --.

Signed and sealed this 11th day of February 1969.

(SEAL)
Attest:

Edward M. Fletcher, Jr.

Attesting Officer

EDWARD J. BRENNER

Commissioner of Patents